United States Patent
Tse et al.

(10) Patent No.: US 6,618,171 B1
(45) Date of Patent: Sep. 9, 2003

(54) BLACK POINT ADJUSTMENT BASED ON IMAGE BACKGROUND

(75) Inventors: Francis Tse, Rochester, NY (US); Ramesh Nagarajan, Fairport, NY (US); Charles E. Farnung, Rochester, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/512,887

(22) Filed: Feb. 25, 2000

(51) Int. Cl.⁷ .................... H04N 1/40; H04N 1/387; H04N 1/38; G06K 9/40
(52) U.S. Cl. .............. 358/446; 358/453; 358/463; 382/254; 382/255
(58) Field of Search ............... 358/446, 453, 358/463; 382/254, 255

(56) References Cited

U.S. PATENT DOCUMENTS

| | | | |
|---|---|---|---|
| 5,031,032 A | 7/1991 | Perregaux et al. | 348/275 |
| 5,046,118 A | 9/1991 | Ajewole et al. | 382/169 |
| 5,164,993 A | 11/1992 | Capozzi et al. | 382/132 |
| 5,282,061 A | 1/1994 | Farrell | 358/464 |
| 5,293,340 A | 3/1994 | Fujita | 365/201 |
| 5,371,615 A * | 12/1994 | Eschbach | 358/515 |
| 5,430,536 A | 7/1995 | Fullerton et al. | 399/364 |
| 5,473,513 A | 12/1995 | Quinn | 361/760 |
| 5,544,258 A | 8/1996 | Levien | 382/169 |
| 5,545,913 A | 8/1996 | Quinn et al. | 257/443 |
| 5,552,828 A | 9/1996 | Perregaux | 348/315 |
| 5,604,362 A | 2/1997 | Jedlicka et al. | 257/233 |
| 5,691,760 A | 11/1997 | Hosier et al. | 347/238 |
| 5,748,344 A | 5/1998 | Rees | 358/505 |
| 5,832,105 A | 11/1998 | Morimoto et al. | 382/151 |
| 5,848,181 A | 12/1998 | Ogata | 382/169 |
| 5,848,183 A | 12/1998 | Farrell | 382/172 |
| 5,881,166 A | 3/1999 | Farrell | 382/168 |
| 6,198,845 B1 * | 3/2001 | Tse et al. | 382/169 |
| 6,240,215 B1 * | 5/2001 | Salgado et al. | 382/254 |
| 6,330,345 B1 * | 12/2001 | Russo et al. | 382/115 |

* cited by examiner

*Primary Examiner*—Edward Coles
*Assistant Examiner*—Houshang Safaipour
(74) *Attorney, Agent, or Firm*—Oliff & Berridge, PLC

(57) ABSTRACT

A digital scanner or copier is provided that can dynamically adjust the black point of an image to be scanned based on detected background level of the document. A pre-scan acts on a small scanning window near a leading edge of the document to obtain a histogram of grey-level values. From this, the background level of the document can be obtained to determine a white point of the image. Additionally, a black point of the image is originally set to a default offset value. However, an adjustment factor based on the detected white point is used to adjust the default offset value to a value that increases the dynamic range of the output image, while still maintaining solid black for black areas of the image.

19 Claims, 6 Drawing Sheets

FIG. 3
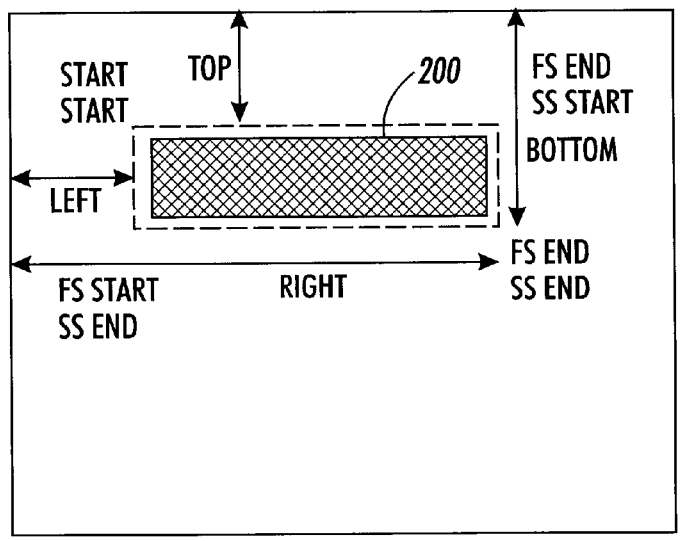
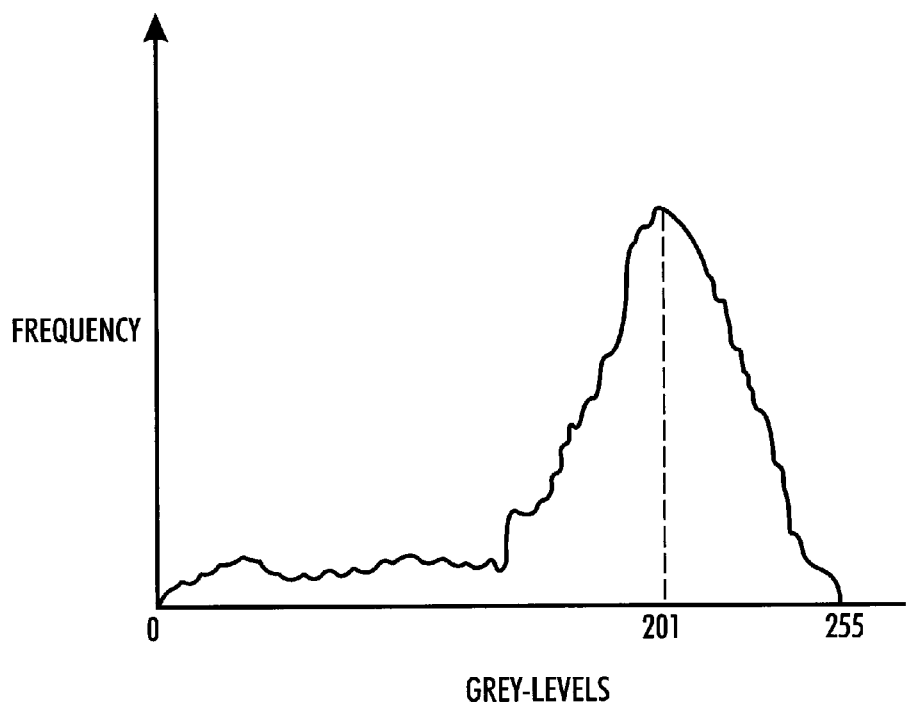
FIG. 4

FIG. 5
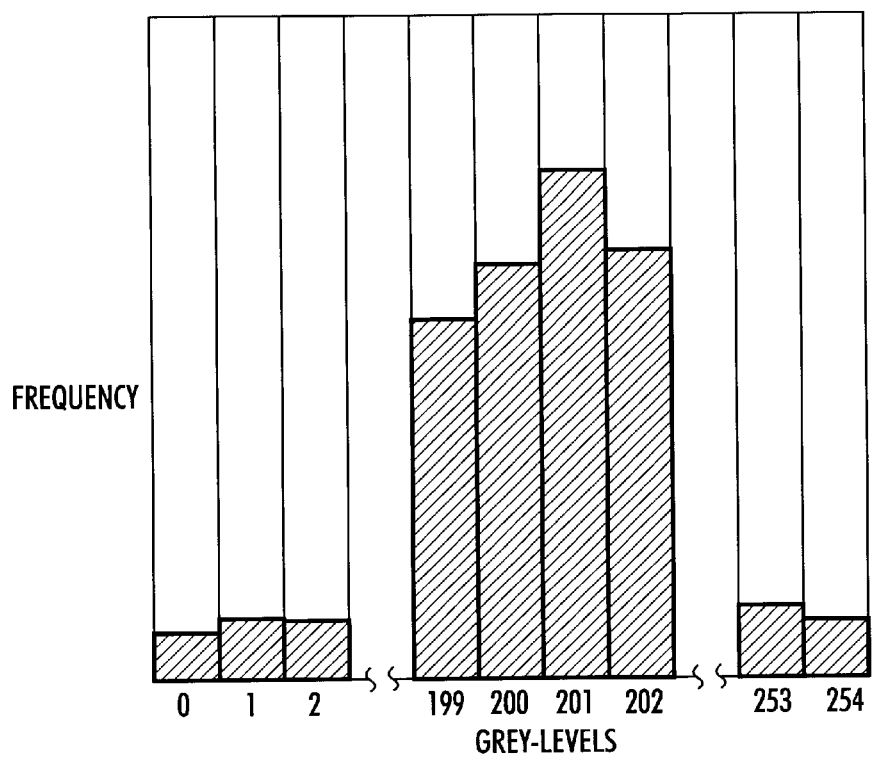
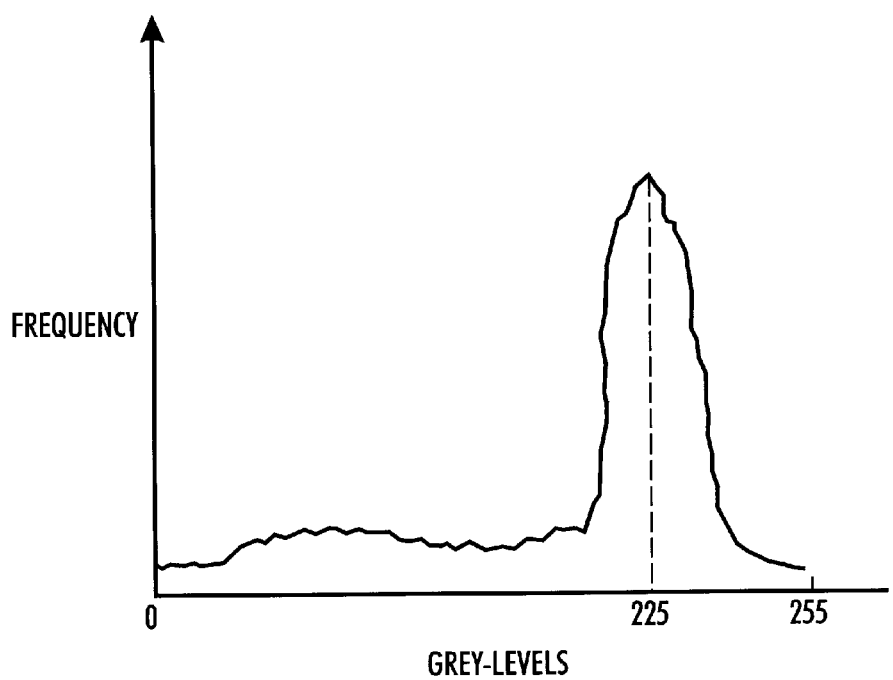
FIG. 6

BLACK POINT ADJUSTMENT BASED ON IMAGE BACKGROUND

BACKGROUND OF THE INVENTION

1. Field of Invention

The invention relates to methods and apparatus for determining background content of an image of a scanned document and using this content to dynamically adjust the black point of the image.

2. Description of Related Art

In conventional scanners and digital copiers, the black point of an image is adjusted statically using a fixed offset value. Such a method works fine for images with white or light background. However, when the input image has a darker background, such as colored paper, the blackest point is also lower and using a fixed offset value causes the background to not be completely suppressed. That is, the use of a single fixed offset for different types of input images (images on various colored backgrounds) does not work very well in suppressing both the background while reproducing quality black text.

One approach to this is to provide several preset modes, each having different offset values. However, picking a different mode with a lower offset value causes the dark areas to not be reproduced as solid black. Another problem with this approach is that a user has to manually set or pick a correct mode. This is inconvenient.

SUMMARY OF THE INVENTION

In copier and scanner systems, copying a document or an original while suppressing the substrate of the original is often required. For example, when the original is printed on colored paper. Such suppression can be achieved by detecting the background color automatically. Background detection can be performed on just the leading edge of the document or the whole document. However, whole page background detection requires pre-scanning of the entire original image. The detected background can be removed by adjusting the gain of the scanned image and clipping the values that exceed the system processing range.

Automatic background suppression senses the background and automatically suppresses it before final printing. Conventional automatic background suppression systems generate a histogram of the document using standard methods and then calculate the mean and standard deviation. Other systems estimate the standard deviation and mean value. Exemplary background detection systems and methods can be found in co-pending U.S. patent application Ser. No. 08/886,205 filed Jul. 1, 1997, copending U.S. application Ser. No. 09/159,038 filed Sep. 23, 1998, and U.S. Pat. No. 5,881,166, the disclosures of which are incorporated herein by reference in their entirety.

The above systems and methods have been used to suppress background and to adjust a tone reproduction curve (TRC). However, such systems have not heretofore used such background information to scale the offset value. Applicants have discovered that the background value determined during a scan of the leading edge of the document can be used to dynamically adjust the fixed offset value for the image. This helps in increasing the dynamic range of the output image without sacrificing the black areas of the image. Moreover, as the histogram only acts on the leading edge, the scan and approximations can be achieved in real-time, thus avoiding the delays necessary to scan an entire image to determine precise white point and black point values.

Thus, a method of scanning a document according to the invention may include: scanning at least a portion of a document; automatically detecting a background of the document to form a white point WP of the image; providing a default fixed offset value FOV used as an initial black point BP of the image; providing a scaled adjustment factor AF dependent on the detected white point WP; providing a scaled black point BP by multiplying the fixed offset value FOV by the scaled offset adjustment factor AF; computing a gain G according to the equation $G=255/(WP-BP)$; and scanning the image and applying the gain G and black point BP to all pixels of the image.

Also, a digital scanner or digital copier according to the invention may include: a scanning unit that can scan the document; a histogram generator that generates a histogram from scanned data corresponding to at least a portion of the scanned document; a computing unit; a fixed offset value FOV stored in memory; and an offset adjuster that calculates an offset adjustment factor AF based on a detected white point WP of the document, wherein the computing unit calculates the white point WP based on the histogram, calculates a black point BP based on the fixed offset value FOV and the detected white point WP, and calculates a gain based on the calculated white point WP and black point BP.

These and other features and advantages of this invention are described in or are apparent from the following detailed description of various exemplary embodiments of the systems and methods according to this invention.

BRIEF DESCRIPTION OF THE DRAWINGS

Various exemplary embodiments of systems and methods according to this invention will be described in detail, with reference to the following figures, wherein:

FIG. 3 is a graphical representation of a sample window used to generate histogram data from an input document according to the present invention;

FIG. 4 is a histogram of the input document;

FIG. 5 is a graphical representation of the histogram of FIG. 4;

FIG. 6 is a smoothed histogram of the input document;

DETAILED DESCRIPTION OF PREFERRED EMBODIMENTS

The present invention relates generally to methods and systems for dynamically adjusting a black point during scanning and outputting of an image from a digital scanner. The digital scanner is capable of being connected to a wide array of copiers, printers, computers, networks, facsimile machines, etc. and capable of scanning and producing complex and interesting images to be stored, printed and displayed. The images may include text, graphics, and scanned or computer-generated images. With this scanner, high quality image output can be achieved by automatically determining an image background and using this information to dynamically adjust a fixed offset used to provide a black point of the image.

Figure 1:
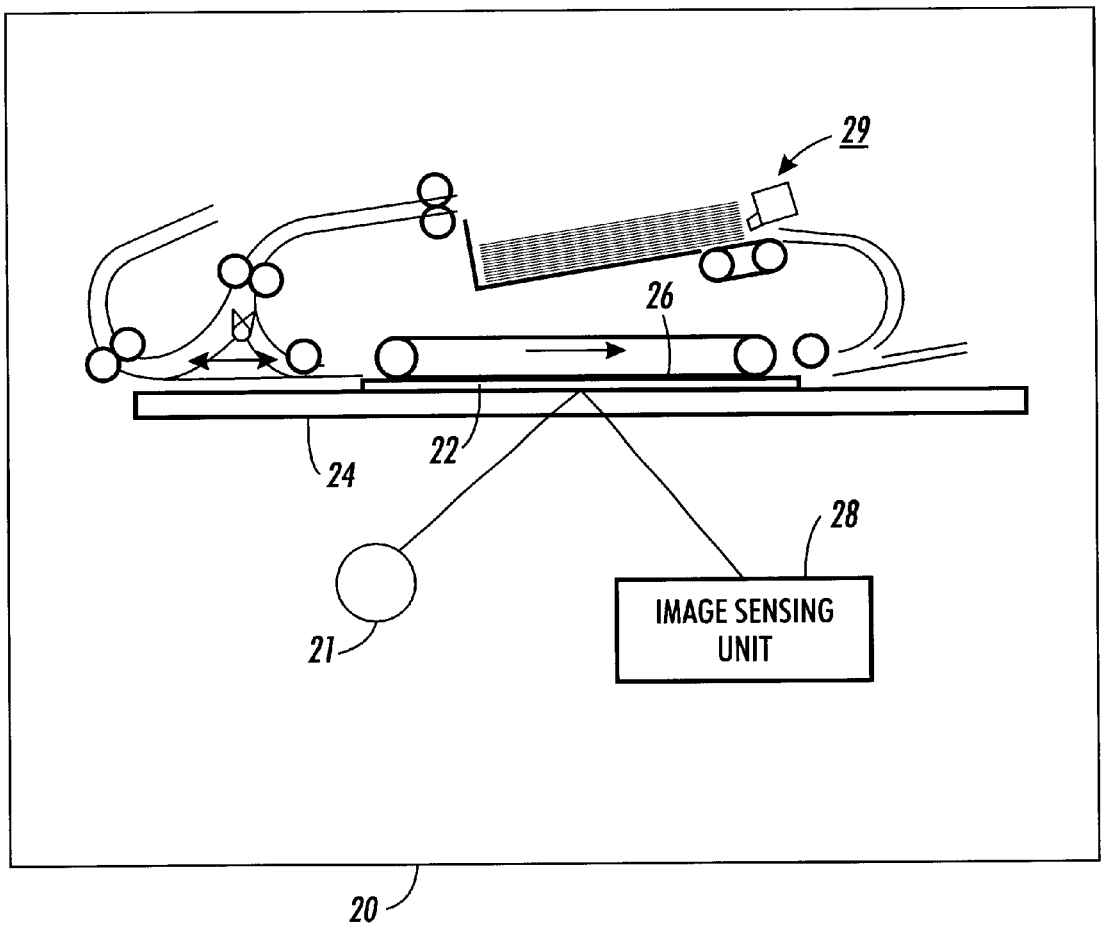
FIG. 1 is a diagram illustrating components of a digital scanner.

FIG. 1 illustrates components of a scanning unit 20 of a digital scanner. In the scanning unit 20, a light source 21 is used to illuminate a document 22 to be scanned. In a platen-type scanning situation, the document 22 usually rests upon a glass platen 24, which supports the document 22 for scanning purposes. The document may be placed in the glass platen 24 by an operator. Alternatively, the scanning unit may include a feeder or document handler 29, which places the document on the glass 24. Another example of a feeder is shown in U.S. Pat. No. 5,430,536.

On top of the glass platen 24 and the document 22, a backdrop portion (platen cover) 26 is placed so as to prevent stray light from leaving the scanning area to provide a background from which an input document can be distinguished. The backdrop portion 26 is part of document handler 29. The backdrop portion 26 is the surface or surfaces that can be scanned by an image-sensing unit 28 when a document is or is not present in the scanning station. The light reflected from the document passes through a lens subsystem (not shown) so that the reflected light impinges upon the image sensing unit 28, such as a charge coupled device (CCD) array or a full width array.

Examples of a full width arrays are found in U.S. Pat. Nos. 5,473,513; 5,748,344; 5,552,828; 5,691,760; 5,031,032; 5,545,913; and 5,604,362. A full width array typically comprises one or more linear arrays of photosites, wherein each linear array may be sensitive to one or more colors. In a full color digital scanner, the linear arrays of photosites are used to produce electrical signals which are converted to color image data representing the document that is being scanned. However, in a black-and-white scanner, preferably only one linear array of photosites is used to produce electrical signals, which are converted to black and white image data representing the image of the document that was scanned.

Figure 2:
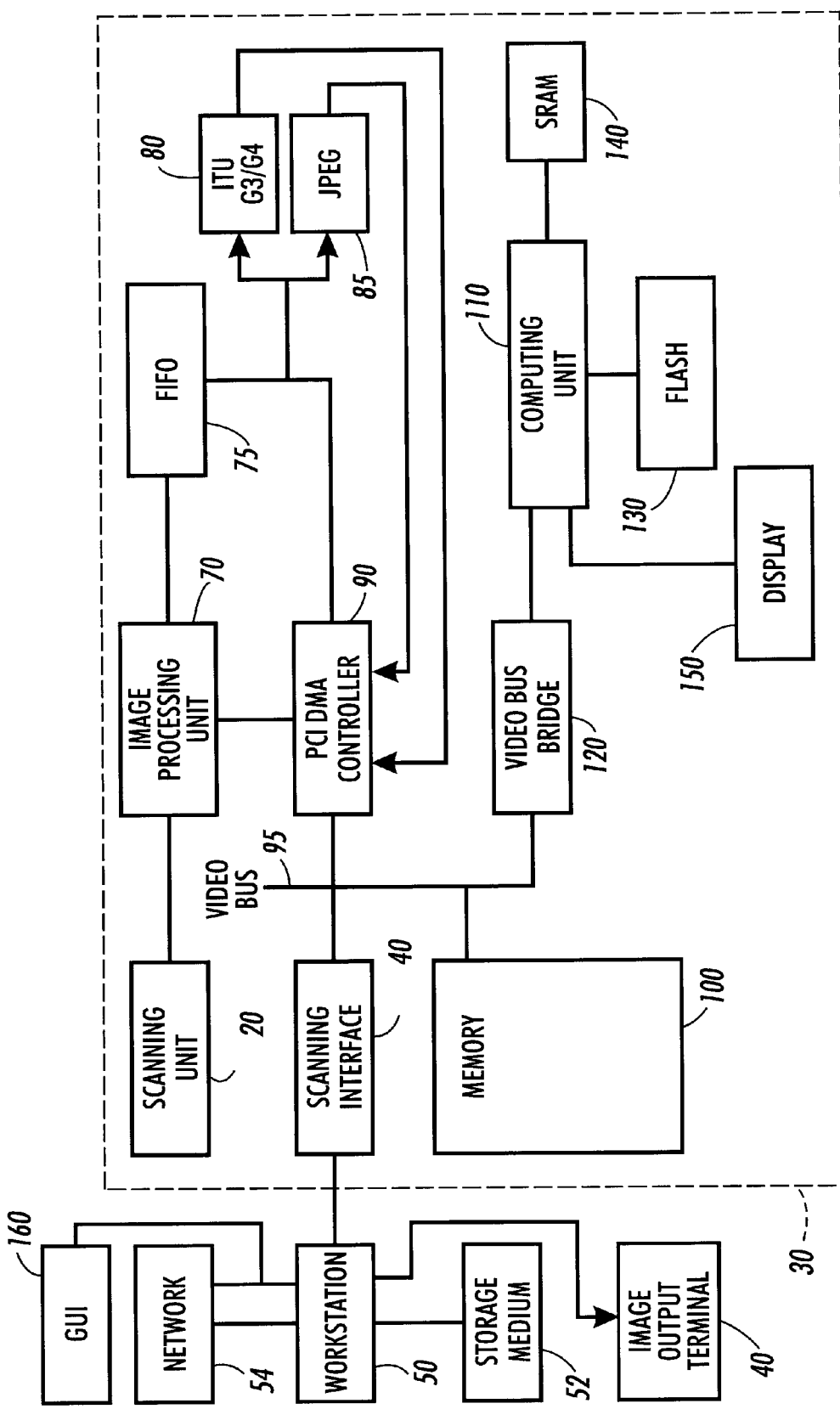
FIG. 2 is a block diagram illustrating the electronic architecture of a digital scanner coupled to a workstation, network, storage medium and image output terminal in accordance with embodiments of the invention.

FIG. 2 is a block diagram illustrating the electronic architecture of digital scanner 30 including scanning unit 20. The digital scanner 30 is coupled to a workstation 50 by way of a scanner interface 40. An example of a suitable scanner interface is a SCSI interface. Examples of the workstation 50 include a personal computer and a computer terminal. The workstation 50 includes and/or has access to a storage medium 52. The workstation 50 is preferably adapted to communicate with a computer network 54, and to communicate with the Internet either directly or through computer network 54. The digital scanner 30 is preferably coupled to at least one image output terminal (IOT) 60, such as a printing system.

The scanning unit 20 scans an image and converts the analog signals received by the image sensing unit 28 into digital signals (digital data). An image processing unit 70 registers each image, and preferably executes signal correction to enhance the digital signals. As the image processing unit 70 continuously processes the digital data, a first-in first-out (FIFO) buffer 75 temporarily stores the digital data outputted by the image processing unit 70, and transmits the digital data to the International Telecommunications Union (ITU) G3/G4 80 and Joint Photographic Experts Group (JPEG) 85 in bursts, so that the processed data is compressed. Other data compression units may be substituted for ITU G3/G4 80 and JPEG 85. The compressed digital data is stored in memory 100, preferably by way of a Peripheral Component Interconnect Direct Memory Access (PCI/DMA) Controller 90 and a video bus 95. Alternatively, an operator may not wish to compress the digital data. The operator may bypass the compression step so that the digital data processed by the image processing unit 70 is sent through FIFO 75 and directly stored in memory 100 by way of PCI DMA controller 90.

A computing unit 110, such as a microprocessor, is coupled to a scanner interface 40, memory 100 and PCI DMA controller 90 by way of the video bus 95 and a video bus bridge 120. The computing unit 110 is also coupled to a flash 130, static RAM 140 and a display 150. The computing unit 110 is also connected to the scanning unit 20 and the image processing unit 70 by way of a control/data bus. For example, the computing unit 110 may be communicating with the image processing unit 70 through the video bus 95 and/or PCI DMA controller 90. Alternatively, the computing unit 110 may communicate directly with different components, such as the image processing unit 70 by way of control/data buses (not shown).

As mentioned previously, automatic background suppression is used in digital copiers/scanners to detect the background value of the input document and to automatically suppress the background without any user intervention or adjustment. This background detection is performed by analyzing the lead edge statistics of a document, such as document 22 in FIG. 3, wherein a group of scanlines are collected to generate a histogram for the input document. Rather than examining the entire document, a small sampling window 200 is applied to the leading edge of the input document 22. A suitable window may be approximately 4,000 pixels by four scanlines and applied to the input document to generate the histogram. The histogram, preferably an 8-bit 256-value histogram, is shown in FIGS. 4 and 5 and represents the eight-bit grey levels of the input document, wherein a grey-level of 0 represents the black pixels and a grey-level of 255 represents the white pixels.

The pixel value having the highest frequency in the sampling window represents the mean grey-level of the background. For example, the mean grey-level of exemplary input document 22 is "201" as shown in FIGS. 4 and 5. The histogram represents the lead edge statistics for the input document. This generated histogram is then preferably smoothed and compressed. A suitable smoothing and compression process is detailed in co-pending Ser. No. 08/886,205, the disclosure of which is incorporated herein by reference in its entirety, to obtain a background value BKG. As shown in FIG. 6, after smoothing and compression, the example of FIGS. 4–5 is shifted to a value of "225" from a mean grey-scale value of "201". This value becomes the background value BKG=225, which also is known as the white point WP for the image. That is, all pixel values of the image greater than the BKG (lighter) are clipped/suppressed and considered to be part of the background.

If the document is scanned through a DADF (feeder 29), the histogram is collected at approximately 1.25 mm into the registered document. On the other hand, if the document is placed on the platen 24 without any document sensing feature enabled, a short prescan is performed. A histogram is then collected at approximately 10 mm from the platen registration corner, wherein the scanlines have a greater offset from the lead edge than in the auto feed example.

During platen scanning, the scanner 20 takes its initial histogram at the 10 mm point because of lack of knowledge of the exact position of the document 22. For example, documents can get skewed while closing the platen cover 26, resulting in collection of data from the platen cover 26 if the histogram is collected at 1.25 mm from the registration corner. Another reason is due to incorrect information present within the first few millimeters of the registration corner due to an integrating cavity effect from the underside of the platen cover 26, which is a common problem with most document scanners.

Figure 7:
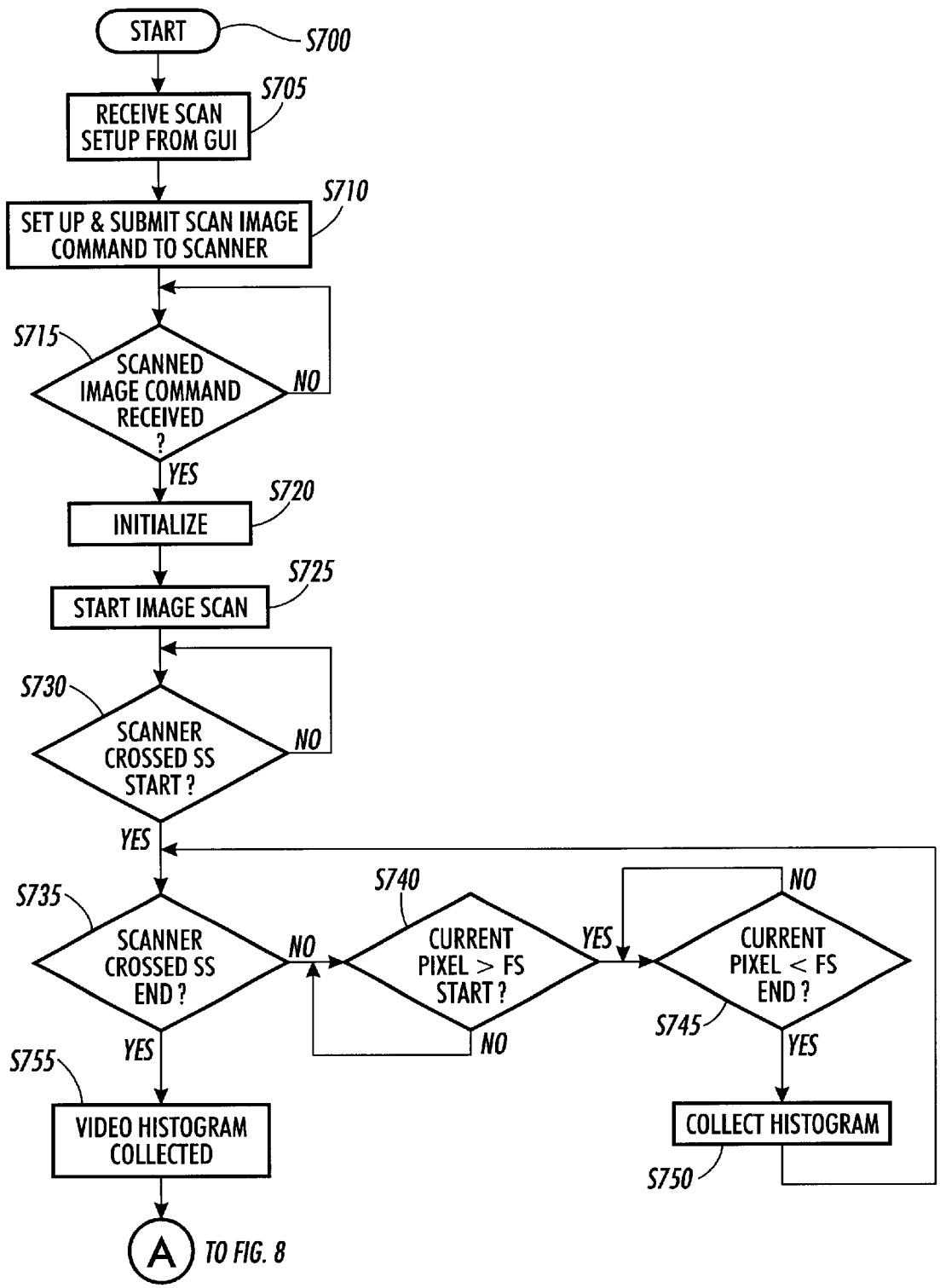
FIG. 7 is a flowchart of an offset adjustment process according to the present invention.
Figure 8:
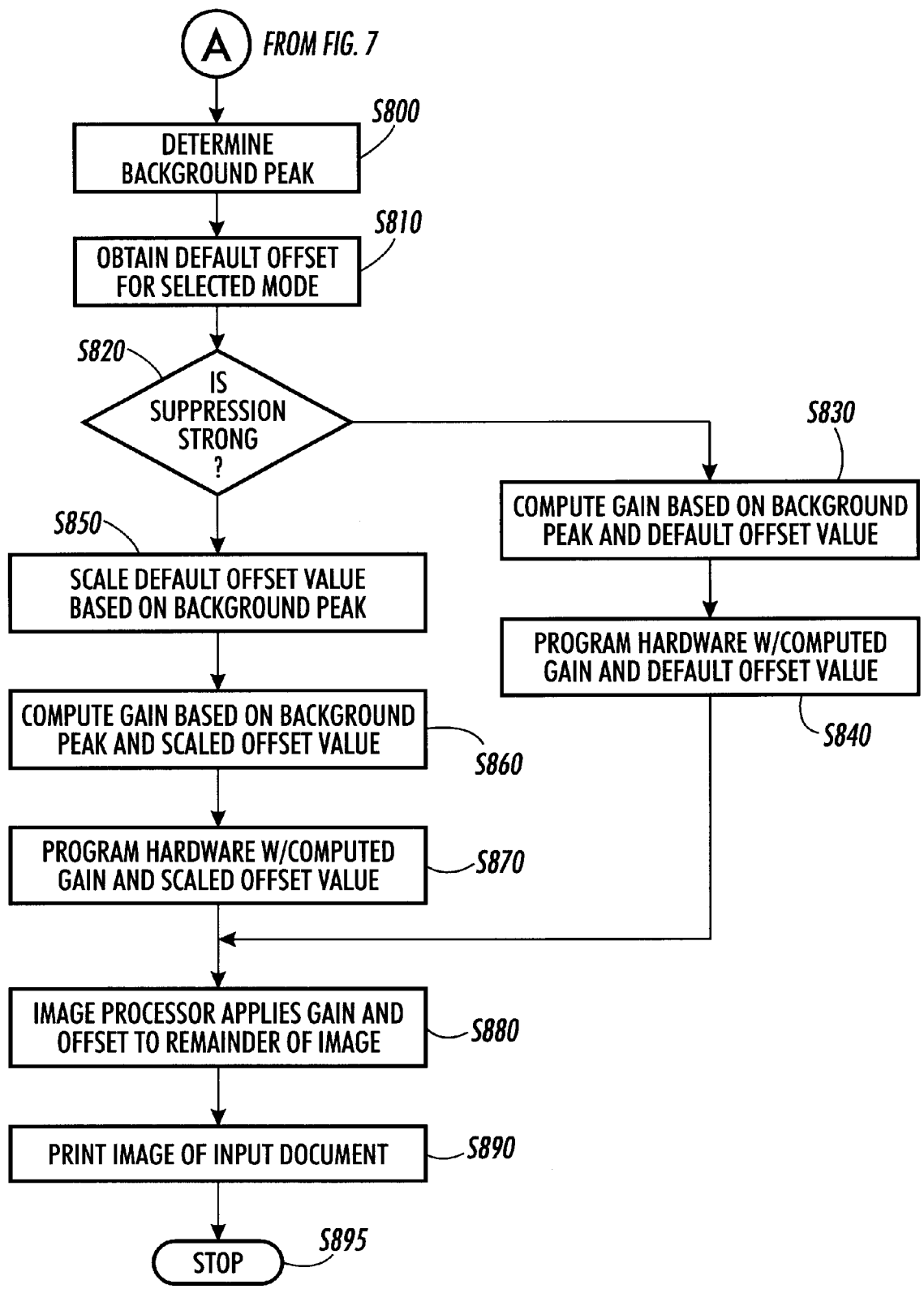
FIG. 8 is a continuation of the flowchart of FIG. 7.

A process for scanning an image and obtaining a printed output therefrom according to the invention will be described with reference to FIGS. 7–8. The process starts at step S700 and advances to step S705 where a scan setup is received from graphical user interface (GUI) 160. A suitable GUI can be found in co-pending Ser. No. 09/511,992 filed concurrently herewith, the subject matter of which is incorporated herein by reference in its entirety. From step S705, flow advances to step S710 where a scan image is set up and a scan image command is submitted to the scanner 30 from workstation 50. Flow then advances to step S715 where the scanner 30 checks for receipt of a scan image command. If not received, flow returns to step S715. If, however, a scan image command is received by the scanner, flow advances to step S720 where the scanner 30 is initialized and then at step S725 the image scan is started. Initially, only a small scan window 200 is scanned, which preferably is on the leading edge of the image. The scan window 200 is defined by four corners. The top left corner is the start corner for both the fast scan direction and the slow scan direction (FS START and SS START). The top right corner is the fast scan end corner (FS END) and continues to be the start in the slow scan direction (SS START). The bottom left corner is the end of the slow scan direction (SS END) and continues to be the start of the fast scan direction (FS START). The bottom right corner is the end of both scan directions (FS END and SS END).

To achieve this leading edge scanning to determine a histogram, the scanner increments first in the fast scan direction and then in the slow scan direction. At step S730, the scanner checks to see whether the slow scan start has been reached. If not, the scanner increments and flow returns to step S730. If it has, flow advances to step S735 where it is checked whether the slow scan end has been reached. If not, flow advances to step S740 where the current pixel is checked to see whether it is beyond the fast scan direction start (FS START). If not, the scanner increments in the fast scan direction and flow returns to step S740. If it has, flow advances to step S745 where it is determined whether the current pixel is less than the fast scan direction end (FS END). If it is, the scanner stores the grey-level value, increments to the next pixel, and the flow returns to step S745. If the current pixel is greater than the FS END, the fast scan row is completed and flow advances to step S750, where the pixel values for that fast scan direction row are collected. After step S750, the scanner is incremented in the slow scan direction and flow returns to step S735, where steps S735–S750 are repeated until the entire scan window has been scanned. At that point where the scanner crosses the SS END position, flow advances from step S735 to step S755, at which time the entire video histogram has been collected.

From step S755, flow advances to step S800, where a background peak BKG (also known as a white point WP) is determined, such as by the methods disclosed in co-pending U.S. applications Ser. Nos. 08/886,205 and 09/159,038 mentioned previously. From step S800, flow advances to step S810, where a default fixed offset value FOV is obtained for a selected mode. Conventionally, a single fixed offset value FOV for a black point is set. However, it is also possible for different black point offset values to be selected depending on the particular mode of operation, i.,e., photo, text or graphics scanning. In the case of a single fixed offset value FOV, a suitable fixed offset grey-scale value is about 20. However, this fixed offset may be set between 0 and 30, depending on the specific mode selected. Selection of the fixed offset value FOV may be performed through GUI 160 or may be performed automatically (i.e., preset).

From step S810, flow advances to step S820, where it is determined whether the suppression is strong. That is, whether the detected background BKG from step S800 is light or dark. There are likely to be problems with both suppressing the background and reproducing black text with sufficient clarity and darkness when the detected background is dark and strong suppression is needed. The detection in step S820 can be performed by comparing the detected background BKG against a fixed threshold, which in an 8-bit grey-level system may be a grey-level of 190, although the threshold is not limited to such a specific threshold value. It has been found that for fairly light backgrounds having a grey-level of greater than 190, use of the fixed offset value FOV for the black point can be retained. Thus, if at step S820, the background is found to be greater than the threshold (signifying a light background and weak suppression), flow advances to step S830, where a gain is computed based on the detected background peak and the default fixed offset value FOV. A suitable formula for gain is:

$$G=255/(WP-BP). \tag{1}$$

where WP is the white point (detected background BKG) and BP corresponds to the offset value FOV. In the example of FIG. 6 with a background BKG of 225 and a fixed default offset value FOV of 20, the gain becomes 255/(201−20)= 1.41. From step S830, flow advances to step S840, where hardware of the scanner is programmed with the computed gain G and the default offset value BP. From step S840, flow advances to step S880, where the image processing unit 70 applies the gain G and offset BP to the remainder of the image. From step S880, flow advances to step S890, where an image is printed from IOT 60 based on the input document. After step S890, the process stops at step S895.

If, however, in step S820 the suppression is determined to be strong, i.e., a dark background BKG below the threshold of 190, a scaling process is performed at step S850 to adjust the offset to expand the dynamic range of the input and produce better black image quality when a dark background is detected, such as printing on a colored background. In particular, the scaling is based on the detected background BKG (WP). The adjustment may be through use of a linear or non-linear equation. A suitable formula for obtaining the offset adjustment factor scaling is:

$$AF=(WP+64)/255, \quad (2)$$

when the detected mean grey-level WP is less than or equal to the threshold of 190. Then, a new black point BP can be determined by setting:

$$BP=\text{OffsetScale}*\text{Default Offset} \quad (3)$$

From step S850, flow advances to step S860 where the gain is computed using equation 1. However, in step S860, the adjusted BP is used rather than the default offset. From step S860, flow advances to step S870 where the hardware of the scanner is programmed with the computed gain G and the scaled black point BP. From step S870, flow advances to step S880, where the image processing unit 70 applies the gain G and offset BP to the remainder of the image. From step S880, flow advances to step S890, where an image is printed from IOT 60 based on the input document. After step S890, the process stops at step S895.

Alternatively, rather than branching to steps S730 and S740, step S750 can scale the offset value based on whether or not the background peak is above or below the threshold. For example, if above the threshold of 190, the OffsetScale can be set to a fixed value of 1 (i.e., no adjustment). However, if equal to or below the threshold of 190, the OffsetScale can be set according to equation (2).

The formula for the OffsetScale is not limited to the above exemplary linear equation, and may be a non-linear equation. Moreover, the fixed threshold of 190 is meant to be illustrative and not limiting.

The operations and determinations discussed above can be implemented using a programmed general purpose computer. However, the various operations and determinations described above can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device capable of implementing a finite state machine that is in turn capable of implementing the operations and determinations discussed above can be used to implement these operations and determinations.

The above system and methods are suitable for use with digital scanners and copiers. Such methods and systems can be used with other processes and systems for adjusting and manipulating output from a scanner. For example, the invention may be used in conjunction with setting or adjustment of a tone reproduction curve (TRC) of the scanner. Examples of methods and systems of TRC adjustment can be found in co-pending applications Ser. Nos. 09/512,769; 09/512,889; and 09/512,888, filed concurrent herewith and incorporated by reference herein in their entirety.

While the systems and methods of this invention have been described in conjunction with the specific embodiments outlined above, it is evident that many alternatives, modifications and variations will be apparent to those skilled in the art. For example, while described with reference to a black and white system, the invention is also applicable to a color system, wherein the black point adjustment essentially would make luminance adjustments to the black point. Accordingly, the exemplary embodiments of the systems and methods of this invention, as set forth above, are intended to be illustrative, not limiting. Various changes may be made without departing from the spirit and scope of the invention.

What is claimed is:

1. A method for dynamically adjusting a black point of a scanned document based on detected image background, comprising:
   scanning at least a portion of a document;
   automatically detecting a background of the document to form a white point WP of the image;
   providing a default fixed offset value FOV used as an initial black point BP of the image;
   providing a scaled adjustment factor AF dependent on the detected white point WP;
   providing a scaled black point BP by multiplying the fixed offset value FOV by the scaled offset adjustment factor AF;
   computing a gain G according to the equation G =255/(WP−BP); and
   scanning the image and applying the gain G and black point BP to all pixels of the image.

2. The method of claim 1, wherein the adjustment factor AF is a linear equation.

3. The method of claim 1, wherein the adjustment factor AF is a non-linear equation.

4. The method of claim 1, wherein the step of providing an adjustment factor AF includes comparing the detected white point WP to a grey-level threshold signifying the degree of background darkness and providing a different adjustment factor dependent on whether the white point WP is below the threshold.

5. The method of claim 4, wherein if the white point WP is above the threshold, AF is set to 1.

6. The method of claim 4, wherein if the white point WP is at or below the threshold, AF is set according to a variable number based on the detected white point WP.

7. The method of claim 6, wherein an eight-bit grey-level is used and the threshold is set to a variable X.

8. The method of claim 7, wherein $$AF=(WP+(255-X))/255.$$

9. The method of claim 8, wherein X is 190.

10. The method of claim 1, further comprising a step of printing a document based on the image.

11. The method of claim 1, wherein only a small portion of the document is scanned to detect the background.

12. The method of claim 11, wherein the small portion is near a leading edge of the document.

13. The method of claim 1, wherein the image is scanned by one of a digital scanner and digital copier.

14. A method for dynamically adjusting a black point of a scanned document based on detected image background, comprising:

scanning a small portion of a document near a leading edge of the document using a digital scanner;

automatically detecting a background of the document to form a white point WP of the image;

providing a default fixed offset value FOV used as an initial black point BP of the image;

providing a scaled adjustment factor AF dependent on the detected white point WP;

providing a scaled black point BP by multiplying the fixed offset value FOV by the scaled offset adjustment factor AF;

computing a gain G according to the equation $G=255/(WP-BP)$; and applying the gain G and black point BP to all pixels of the image.

15. The method of claim 14, wherein the adjustment factor AF is a linear equation based on the detected white point WP.

16. A digital scanner capable of dynamically adjusting a black point of an image on a document to be scanned based on a detected background of the image, comprising:

a scanning unit that can scan the document;

a histogram generator that generates a histogram from scanned data corresponding to at least a portion of the scanned document;

a computing unit;

a fixed offset value FOV stored in memory; and an offset adjuster that calculates an offset adjustment factor AF based on a detected white point WP of the document, wherein the computing unit calculates the white point WP based on the histogram, calculates a black point BP based on the fixed offset value FOV and the detected white point WP, and calculates a gain based on the calculated white point WP and black point BP.

17. The digital scanner of claim 16, wherein the fixed offset value FOV is the black point BP if the white point WP is above a certain grey-level threshold.

18. The digital scanner of claim 16, wherein the black point BP corresponds to the FOV multiplied by the AF when the white point WP is below the grey-level threshold.

19. The digital scanner of claim 16, further comprising an image processor that applies the calculated gain and black point BP to the image.

* * * * *